Sept. 6, 1932.                R. H. HUMMERT                1,875,607
                     AIRPLANE INNER CONTROLLED SPOT LAMP
                             Filed July 25, 1930

INVENTOR,
Robert H. Hummert
BY Howard D. Smith
        His ATTORNEY

Patented Sept. 6, 1932

1,875,607

UNITED STATES PATENT OFFICE

ROBERT H. HUMMERT, OF DAYTON, OHIO, ASSIGNOR TO THE S. H. THOMSON MANUFACTURING COMPANY, OF DAYTON, OHIO, A CORPORATION OF OHIO

AIRPLANE INNER-CONTROLLED SPOT LAMP

Application filed July 25, 1930. Serial No. 470,628.

This invention relates to new and useful improvements in airplane inner-controlled spot lamps.

It is one of the principal objects of my invention to provide for airplanes, a spot lamp which may easily be projected through an opening in the bottom of the fuselage for the purpose of lighting the landing field, or for signaling, night photography or other uses.

After it has been used, my spot lamp may be easily drawn back into the streamline bottom of the fuselage and locked there until its light is again needed.

The spot lamp is so constructed that the operation of projecting it below the fuselage may be easily effected by the pilot or other operator, and thereafter controlled by him to direct its rays in the desired manner.

Other important and incidental objects will be brought out in the following specification and particularly set forth in the subjoined claims.

Figure 1:
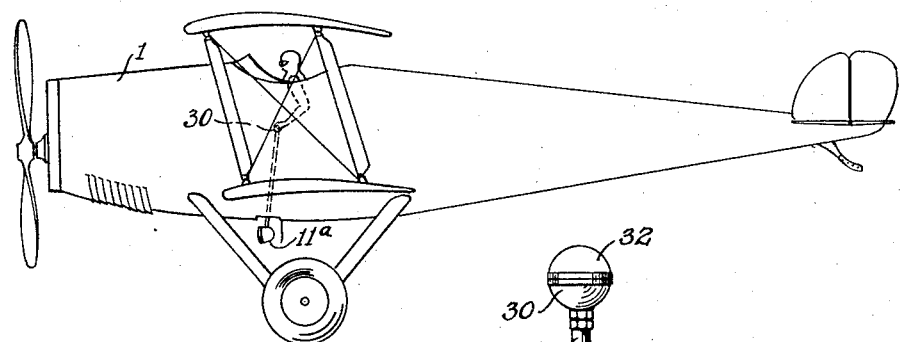
Figure 2:
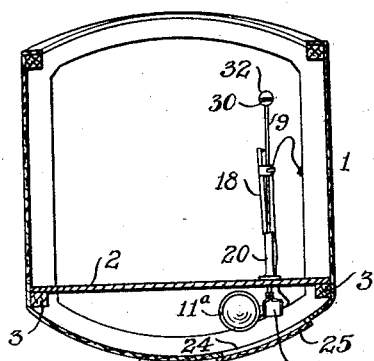
Figure 3:
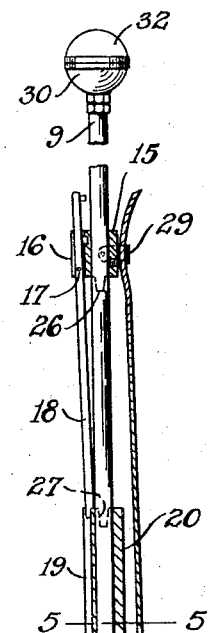
Figure 4:
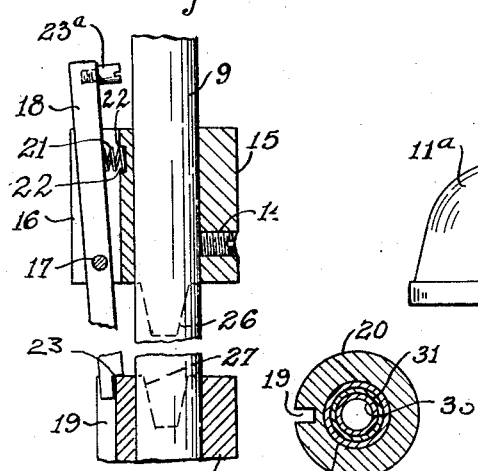
Figure 5:
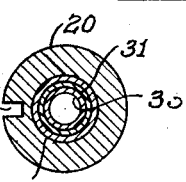

In the accompanying drawing illustrating my invention, Figure 1 is a side view of an airplane containing my inner-controlled spot lamp. Figure 2 is a cross sectional view taken through the fuselage, showing the spot lamp within the streamline bottom of the same. Figure 3 is a longitudinal sectional view taken through my airplane inner-controlled spot lamp. Figure 4 is a longitudinal sectional view taken through the fulcrum collar. And Figure 5 is a cross sectional view taken through my airplane spot lamp on the line 5—5 of Figure 3.

Referring to the accompanying drawing for a detailed description of my invention, the numeral 1 designates an airplane fuselage having below its floor 2 and lower supporting longerons 3, a streamline bottom 4. (See Figure 2.)

Secured to the floor 2 at one side of the pilot's seat (not shown) is a sleeve bracket 6 formed with a wide base flange that is secured to the fuselage floor by bolts 7 and nuts 8. This bracket has an axial hole to freely receive a lamp supporting tube that projects downwardly through a hole 10 in the floor 2. Attached to the lower end of this tube 9 is a gear housing 11 which forms the pivotal support for a spot lamp 11ª. (See Figures 2 and 3.)

Secured to the tube 9 a short distance above the gear housing 11 is a stop collar 12. Projecting axially upward from the collar 12 is a pin 13 that enters an axial hole in the bracket sleeve 6 to prevent the tube 9 from turning when the spot lamp is fully within the fuselage bottom 4 as shown in Figure 2.

For the purpose of automatically locking the spot lamp 11ª in its out of the way position within the streamline bottom of the fuselage, I have provided the following means. Fixedly secured to the upper end portion of the tube 9 by a screw 14 is a fulcrum collar 15 formed with a peripheral slot whose walls terminate in two parallel axial flanges 16, 16. (See Figures 3 and 4.)

Fulcrumed between the flanges 16, 16 by a pivot pin 17 is a guiding and locking bar 18. The front end of this bar freely enters an axial slot 19 in the periphery of the sleeve portion 20 of the bracket 6, and is held within the slot by the outward pressure exerted against its upper end by a coil spring 21 seated within a recess 22 in the slotted portion of the collar 15.

The lower or inner end of the bar 18 is formed with a radial shoulder 23 which is snapped against the upper end of the sleeve 20 by the spring 21 to lock the spot lamp in its out of the way position. (See Figures 2 and 3.) A radial stop pin 23ª is carried by the outer end of the bar.

Immediately below the spot lamp 11ª in the bottom 4 of the fuselage there is a hole 24 closed by a downwardly swinging door 25, although any other type of door may be provided. For projection through the hole 24 the spot lamp is unlocked by pressing inwardly upon the rear end of the bar 18 to raise its shouldered portion 23 above the upper edge of the sleeve 20. The lower end of the bar 18 is then free to travel downwardly through the slot 19 to prevent the spot lamp from turning during its descent.

Formed on the inner end of the fulcrum collar are two axial lugs 26 adapted to enter axial notches 27 in the upper end portion of the sleeve 20 of the bracket 6. The engagement of these lugs in the notches 27 assist the bar 18 in holding the tube 9 in a stationary position for an operation of the spot lamp through means to be hereinafter described.

Electric current is conducted to the spot lamp 11ª by a flexible electric cable 27 which leads from the gear housing 11 through a hole in the bracket flange, then through a guide clip 28 on the collar 12 and a similar guide clip 29 on the fulcrum collar 15, to a source of electric current (not shown).

When the spot lamp is in its projected position shown in Figure 1, its operation is inner controlled by the semi-spherical handle portion 30 and hollow shaft 31 within the tube 9, and semi-spherical handle portion 32 and shaft 33 which projects through the hollow shaft 31, in the manner described in my United States Letters Patent No. 1,720,836, granted July 16th, 1929. While preferring this method of controlling the spot lamp 11ª, it may be operated by any other means that lend themselves for use with my projecting device above described.

The spot lamp may be easily operated by the pilot at all times, since he has only to press inwardly upon the upper end of the locking bar 18 and push the lamp 11ª through the hole in the bottom of the fuselage until the lugs 26 engage in the notches 27 in the sleeve bracket. Then the supporting tube 9 will be firmly held against rotation while the shafts 31 and 33 are easily turned by the handle portions 30 and 32 respectively to bring the lamp to the desired position for signaling, photographing and landing. After the need for its use has ceased, the lamp may be easily drawn back into the fuselage by its handle portion where it will be automatically locked therein by the engagement of the shouldered end of the bar 18 with the upper end of the bracket sleeve.

Having described my invention, I claim:

1. A spot lamp of the type described, comprising an elongated lamp-supporting tube, a spot lamp dirigibly secured to the outer end of said tube, shaft means in the latter for turning the spot lamp, a handle carried by the inner end of said tube for operating the lamp turning means, a bracket sleeve through which said tube is free to be moved to an advanced position for operation of said lamp, said bracket sleeve formed with an axial slot, a collar fixedly secured to the inner end of said tube, and a locking member projecting from said collar into the slot in the bracket sleeve, for the purpose specified.

2. A spot lamp of the type described, comprising an elongated lamp-supporting tube, a spot lamp dirigibly secured to the outer end of said tube, shaft means in the latter for turning the spot lamp, a handle carried by the inner end of said tube for operating the lamp turning means, a bracket sleeve through which said tube is free to be moved to an advanced position for operation of said lamp, said bracket sleeve formed with an axial slot, a fulcrum collar fixedly secured to the inner end of said tube, and a member pivotally secured to said collar, for entrance at its inner end into said groove for the purpose specified.

3. A spot lamp of the type described, comprising an elongated lamp-supporting tube, a spot lamp dirigibly secured to the outer end of said tube, shaft means in the latter for turning the spot lamp, a handle carried by the inner end of said tube for operating the lamp turning means, a bracket sleeve through which said tube is free to be moved to an advanced position for operation of said lamp, said bracket sleeve formed with an axial slot, a fulcrum collar fixedly secured to the inner end of said tube, a bar fulcrumed on said collar, a shouldered outer end on said bar for travel through the axial slot in the bracket sleeve and a coil spring between the collar and the inner end of said bar for the purpose specified.

4. In an airplane having a fuselage, a floor in the latter, a streamlined bottom below said floor, a bracket sleeve secured to said floor, said floor and the fuselage bottom formed with registering holes, a lamp supporting tube movably secured to said bracket for a straight down movement through said holes, and a spot lamp carried by the lower end of said tube.

5. In an airplane having a fuselage, a floor in the latter, a bracket sleeve secured to said floor, the latter formed with a hole below said bracket sleeve, said bracket sleeve formed with an axial slot, an elongated lamp supporting tube movable through said bracket sleeve downwardly through the hole in said floor, a spot lamp dirigibly secured to the lower end of said tube for projection below the fuselage, and locking means carried by said tube for entrance into said slot in the bracket sleeve, for the purpose specified.

In witness whereof I have hereunto set my hand this 23rd day of July, 1930.

ROBERT H. HUMMERT.